United States Patent
Hoenersch et al.

[19]

[11] Patent Number: 5,803,698
[45] Date of Patent: *Sep. 8, 1998

[54] BODIED VEHICLE

[76] Inventors: Klaus Hoenersch, Bgm.-Schlosser-Str. 5, D-86199 Augsburg; Rudolf Helget, Vordere Bergstr. 10, D-89428 Syrgenstein; Walter Hurler, Eppaner Str. 19, D-86316 Friedberg, all of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 656,364

[22] PCT Filed: Dec. 19, 1994

[86] PCT No.: PCT/EP94/04224

§ 371 Date: Nov. 25, 1996

§ 102(e) Date: Nov. 25, 1996

[87] PCT Pub. No.: WO95/17319

PCT Pub. Date: Jun. 29, 1995

[30] Foreign Application Priority Data

Dec. 21, 1993 [DE] Germany ............ 43 43 655.2
Dec. 2, 1994 [DE] Germany ............ 44 42 939.8

[51] Int. Cl.⁶ .................................................. B60P 3/055
[52] U.S. Cl. ...................... 414/495; 296/203; 296/210
[58] Field of Search ................ 414/495; 296/203, 296/210

[56] References Cited

U.S. PATENT DOCUMENTS

| 1,523,636 | 1/1925 | Dunn ............................ 296/203 |
| 3,180,503 | 4/1965 | Shaw ............................ 414/495 X |
| 3,537,745 | 11/1970 | Herring, Jr. ................. 414/495 X |
| 3,666,130 | 5/1972 | Ellerd ........................... 414/495 X |
| 5,096,216 | 3/1992 | McCalla ....................... 414/495 X |
| 5,145,307 | 9/1992 | Smethwick et al. ......... 414/495 X |

FOREIGN PATENT DOCUMENTS

| 2179890 | 11/1973 | France . |
| 2263925 | 10/1975 | France . |
| 2504465 | 10/1982 | France . |
| 8234715 | 10/1983 | Germany . |
| 4114044 | 11/1991 | Germany . |
| 2059885 | 4/1981 | United Kingdom . |
| 1601320 | 10/1981 | United Kingdom . |
| 8800538 | 1/1988 | WIPO ............................ 414/495 |
| 92009452 | 6/1992 | WIPO ............................ 414/495 |

*Primary Examiner*—David A. Bucci
*Attorney, Agent, or Firm*—Welsh & Katz, Ltd.

[57] ABSTRACT

A vehicle with superstructure is used to transport containers, boxes or other loads, especially beverage crates. Several loading boxes are directly or indirectly secured on both sides to a central support arranged in the upper region of the superstructure and run in the longitudinal direction of the vehicle, whereby at least part of the loading boxes can be raised or lowered by lifting devices and the loading boxes are fitted on a raisable and lowerable holding device.

8 Claims, 4 Drawing Sheets

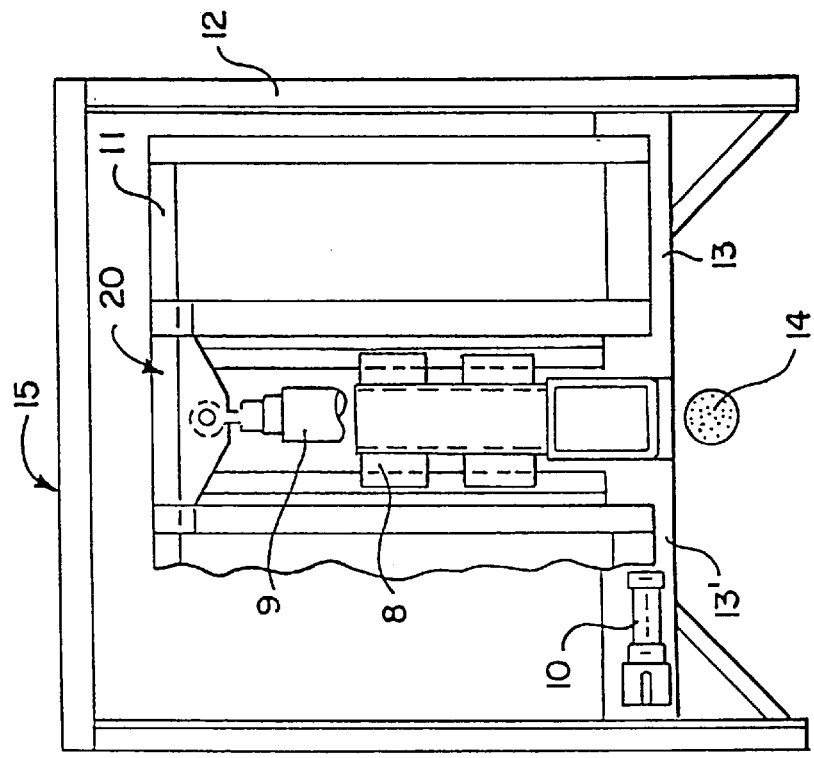
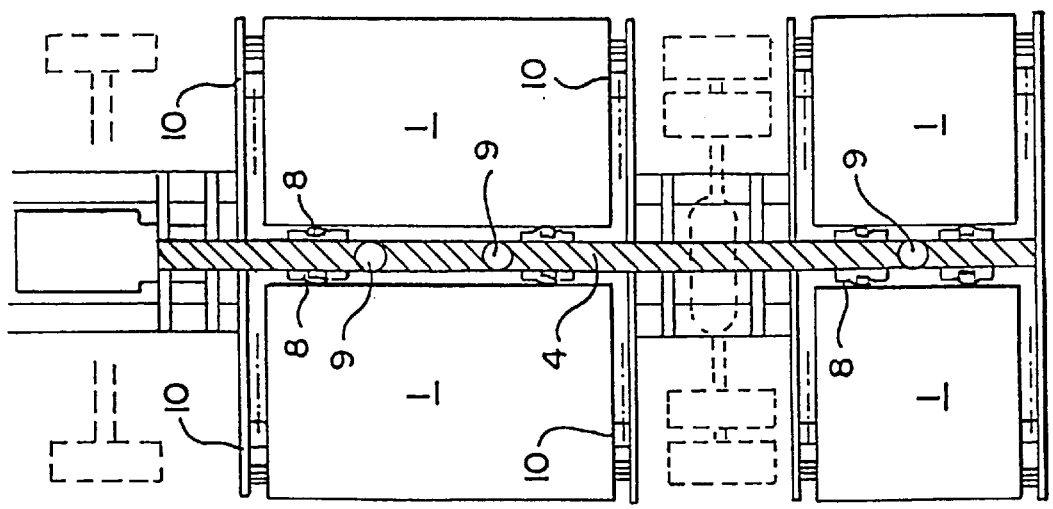

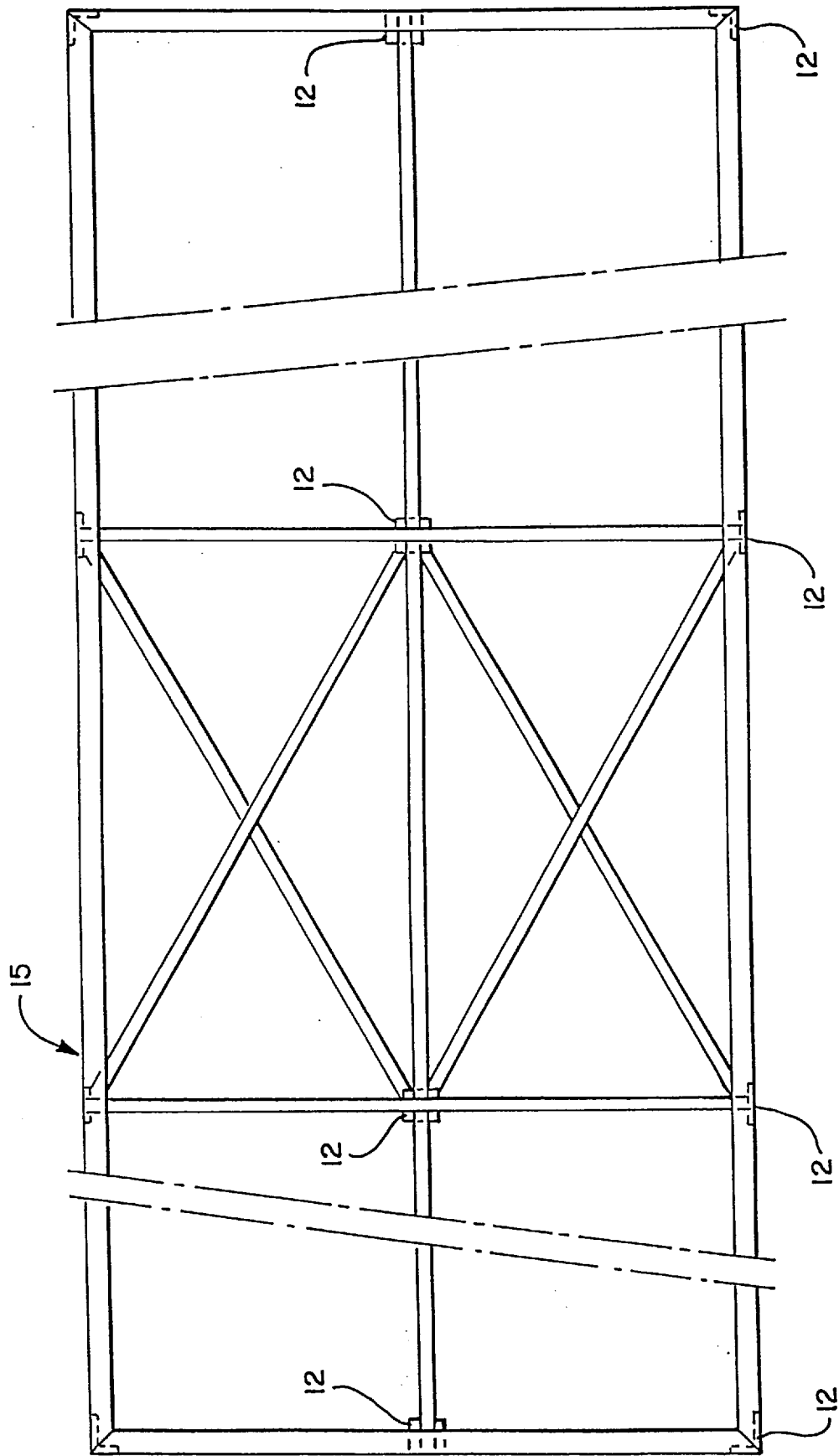

BODIED VEHICLE

FIELD OF THE INVENTION

The invention relates to a bodied vehicle of the type more closely defined in the preamble of claim 1.

BACKGROUND OF THE INVENTION

For the loading and unloading of lorries, fork-lift trucks or similar lifting devices must often be used to lift the cargo from the ground onto the often relatively high loading area and also down again, insofar as the raising and lowering is not performed manually. This process is very time-consuming and thus expensive, since the fork-lift truck is always able in each case to accept only part of the cargo in a loading operation and therefore has repeatedly to receive goods, lift them onto the lorry and deposit them there.

A further drawback of this process for loading and unloading a lorry is that a fork-lift truck must in the first place be present to allow the freight to be loaded and unloaded. For this reason, a collapsible fork-lift truck is carried in a large number of lorries so that there is no need for a fork-lift truck to be present at the destination. However, the maximum payload and the maximum usable loading space of the lorry are reduced by carrying a fork-lift truck of this type, so that the economic effectiveness of the lorry suffers under this solution.

Although it is possible to attach the fork-lift truck to the outside of the rear wall of the lorry, this must then be secured by very expensive and complex mechanisms against falling onto the road.

A vehicle of the generic type is known from DE 41 14 044 A1. The said publication describes a lorry having a device for the transport of crates, piece goods, merchandise or various materials in the stacked state. The device is formed by a supporting frame fastened to the chassis and by a movable structure, which forms compartments which are open and disposed on both sides of the vehicle and is vertically adjustable between a setting lowered to the earth for loading/unloading the material and a raised setting for vehicle road travel.

Moreover, the known vehicle is provided with a fixed roof under which the open compartments are provided.

DE-U-94 08 263 discloses a commercial vehicle, especially a drinks vehicle having a low loading platform. In this vehicle, at least parts of the loading platform are suspended, such that they can be lowered down to the ground, from a centre frame supported on the axles. Moreover, the side walls of the vehicle and the roof of the body are suspended rigidly from the centre frame by transverse members disposed at the ends of the lowerable loading platform sections.

A drawback with the vehicles known from the prior art is however that their stability, especially in the event of twisting motions about the centre longitudinal axis of the vehicle, is relatively poor, since the front and rear axles of the respective vehicle are joined essentially only by a middle member and by the universal joint shaft for the rear axle drive, so that virtually the whole of the acting forces have to be absorbed by these structural parts, especially by the middle member and centre frame respectively.

A further drawback of the known vehicles is that they are difficult to load and unload, especially on ramps, so that loading and unloading on ramps can only be done with these vehicles by using suitable external lifting devices such as, for example, fork-lift trucks.

SUMMARY OF THE INVENTION

The object of the present invention is to provide a bodied vehicle which exhibits improved stability relative to the prior art and which can be easily and rapidly loaded and unloaded.

According to the invention, this object is achieved by the fact that the roof has roof stays for absorbing at least part of the forces acting upon the vehicle and that the loading boxes can be raised from the setting in normal running to the height of the ramp, a free space being left between the loading boxes and the roof during normal running of the vehicle.

The provision of roof stays which absorb at least part of the forces acting upon the vehicle means that the vehicle according to the invention is substantially more stable than vehicles known from the prior art, since now not only do virtually all acting forces have to be transferred to the middle member, but at least part of the forces is also absorbed by the roof stays.

The facility to raise the loading boxes from the setting in normal running to the height of the ramp, especially the head ramp height, means that the vehicle according to the invention can be very simply and easily loaded and unloaded on ramps and head ramps, since the body is raised only to the height of the ramp, so that the vehicle can be loaded and unloaded, for example, by means of sack barrows, lift trucks or indeed by hand.

Although it would be theoretically conceivable to run the vehicle with loading boxes or the like already raised to ramp height, because of the unfavourable high centre of gravity and the further increased forces and moments which consequently act upon the middle member, this option is scarcely feasible in practice. Moreover, the high centre of gravity would produce unfavourable driving characteristics, especially with the vehicle in the loaded state.

Although in this arrangement, in normal running of the vehicle, a free space is left between the loading boxes and the roof of the vehicle, which free space is not available for freight, this drawback is more than offset by the prospect of rapid loading and unloading on ramps.

The facility to lower the loading boxes down to the roadway, which facility is known from the prior art, means that the vehicle according to the invention is thus able to be simply and rapidly loaded and unloaded in any situation.

The loading boxes can be movable in pairs, i.e. two loading boxes which are arranged symmetrically relative to the middle member, or it can also be envisaged that, where suitable devices are additionally fitted, each loading box should be individually movable.

In an advantageous embodiment of the invention, it can be envisaged that the members of the roof stays should be disposed diagonally across the loading boxes over the entire usable length of the vehicle body.

A possible arrangement of the members of the roof stays diagonally across the loading boxes over the entire usable length of the vehicle body allows the rigidity of the body to be further enhanced.

Advantageously, the roof stays can be attached to a plurality of vertical members running broadly perpendicular to the road surface.

The vertical members do not in this case move in accompaniment, so that the vertical members, together with the aforementioned roof stays and further members yet to be described, form a skeleton or frame which is very robust and is therefore capable of absorbing relatively large incidental forces.

In this way, the roof stays and vertical members produce a stable frame which prevents the middle member from being severely twisted.

The vertical members can also be attached to transverse members running transversely to the vehicle longitudinal axis.

Provided that they do not impede the lowering of the loading boxes, these transverse members can be disposed beneath the loading boxes or, for example, between individual loading boxes, which likewise helps to stiffen the whole of the vehicle body.

For the lowering or raising of the loading boxes, the lifting device can be hydraulically or pneumatically driven. Since, in a great many lorries, hydraulic or pneumatic systems are already present for driving a wide variety of apparatus, the apparatus described can be easily and cheaply driven in this way.

The lifting device can also however advantageously be realized as a lifting spindle, which is driven, for example, by an electric motor.

A drive motor for a lifting spindle of this type can also easily be driven without difficulty using the on-board power system of the lorry.

In order to ensure that the individual drive devices are able to make do with a relatively low drive capacity, they can be positioned at points on the vehicle body according to the invention at which a favourable force transfer or force transmission to the take-up device is possible.

The lifting devices can therefore advantageously be disposed on the middle member, since, for reasons of symmetry, from the middle member running parallel to the vehicle longitudinal axis of the lorry, a uniform force transfer in all directions is possible.

It can here be envisaged, for example, that for each pair of loading boxes a dedicated lifting device should be provided, so that not all loading boxes have to be moved together, but rather a pair of loading boxes is able to be lifted or lowered.

Advantageously, each loading box can be guided in at least two guide rails.

The loading boxes can thereby be prevented from tilting as they are raised and lowered, even if the individual loading boxes were to be unevenly loaded.

The guide rails can also be integrated into the aforementioned vertical members, so that the guide rails do not lay claim to additional structural space.

In an advantageous refinement of the invention, it can be envisaged that each loading box should be secured by at least one securing device.

The provision of an additional securing device serves to ensure that unintentional lowering of the loading boxes onto the road, for example whilst the lorry is travelling, is prevented and the vehicle is therefore unable to provoke any dangerous situations.

The securing device can be realized, for example, as a pneumatic cylinder, which locks the loading boxes against unintentional lowering in the raised state.

In order to protect the cargo from weather influences, the loading boxes can be able to be closed off by doors or blinds.

Two illustrative embodiments of the invention are described in basic outline below with reference to the drawing, in which:

BRIEF DESCRIPTION OF THE DRAWINGS

FIG. 3 shows a section along the line III—III of FIG. 1;

FIG. 4 shows a section along the line IV—IV of FIG. 1; and

FIG. 5 shows a view of an illustrative embodiment of roof stays.

DETAILED DESCRIPTION OF THE DRAWINGS

Figure 1:
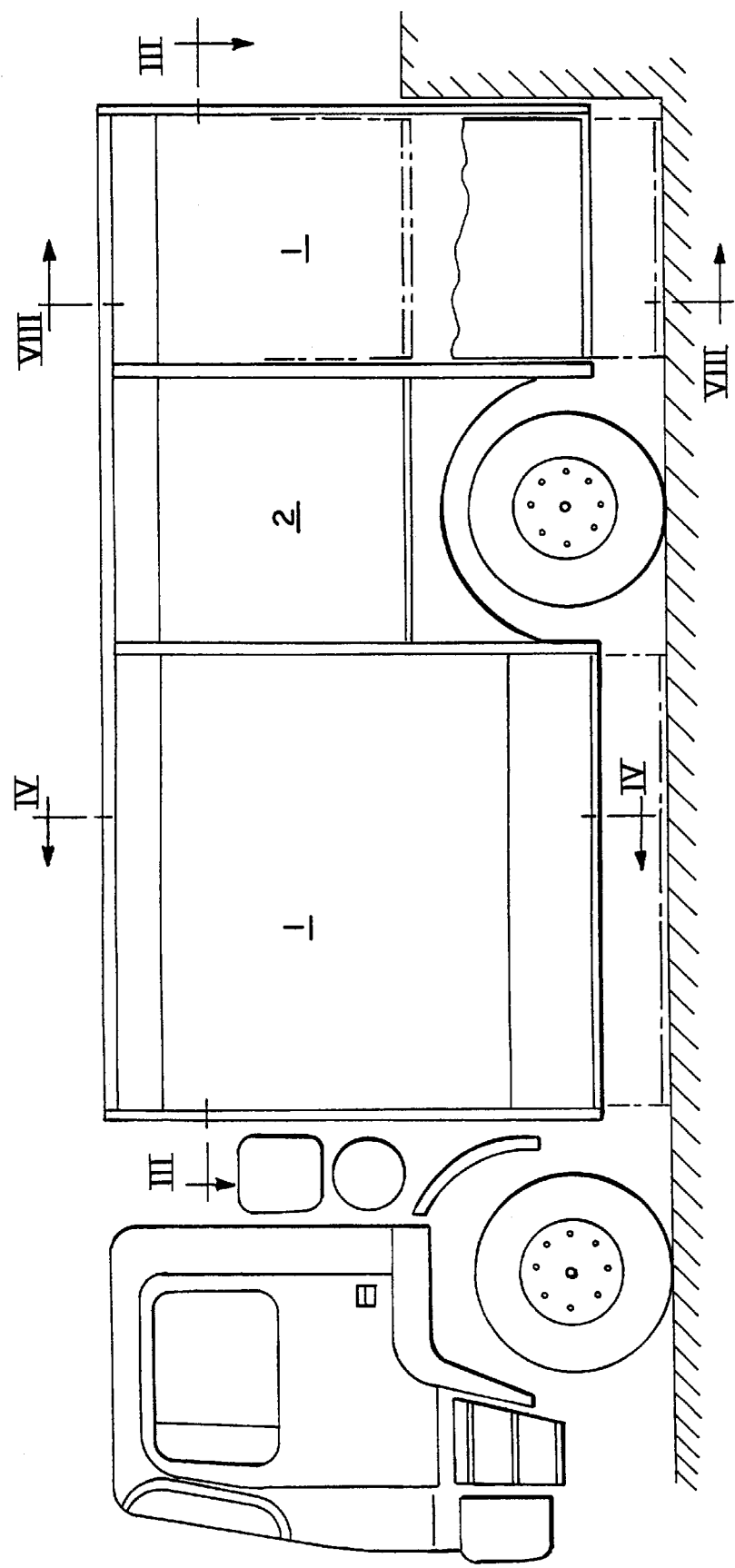
FIG. 1 shows a side view of a lorry provided with a body according to the invention.

Referring to FIG. 1, a side view of a vehicle is represented.

The vehicle has lowerable loading boxes 1 and, in the region of the rear axle of the vehicle, a non-lowerable cargo bay 2. Since the cargo bay 2, because of the axle disposed beneath it, cannot be realized in lowerable construction, it can be used, for example, to house the control and operating elements for lifting and lowering the loading boxes 1. Alternatively, the cargo bay 2 can also of course be used to house cargo, in which case the possibility can also be envisaged of a through-load facility from a loading box 1 disposed on the tailgate of the vehicle through the cargo bay 2 into a further loading box 1.

This is particularly advantageous if the lorry approaches a so-called head ramp backwards.

The loading boxes 1 can then be raised to the height of the head ramp, usually measured at 1,000 mm, so that, as illustrated by the dash-dot line in FIG. 1, all loading boxes 1 or their bottoms are at the same height as the bottoms of the cargo bay 2. A precondition for this through-loading facility is however that doors, blinds or the like should be present on the rear side of the lorry for the loading of the loading boxes 1 and cargo bay 2.

Figure 2:
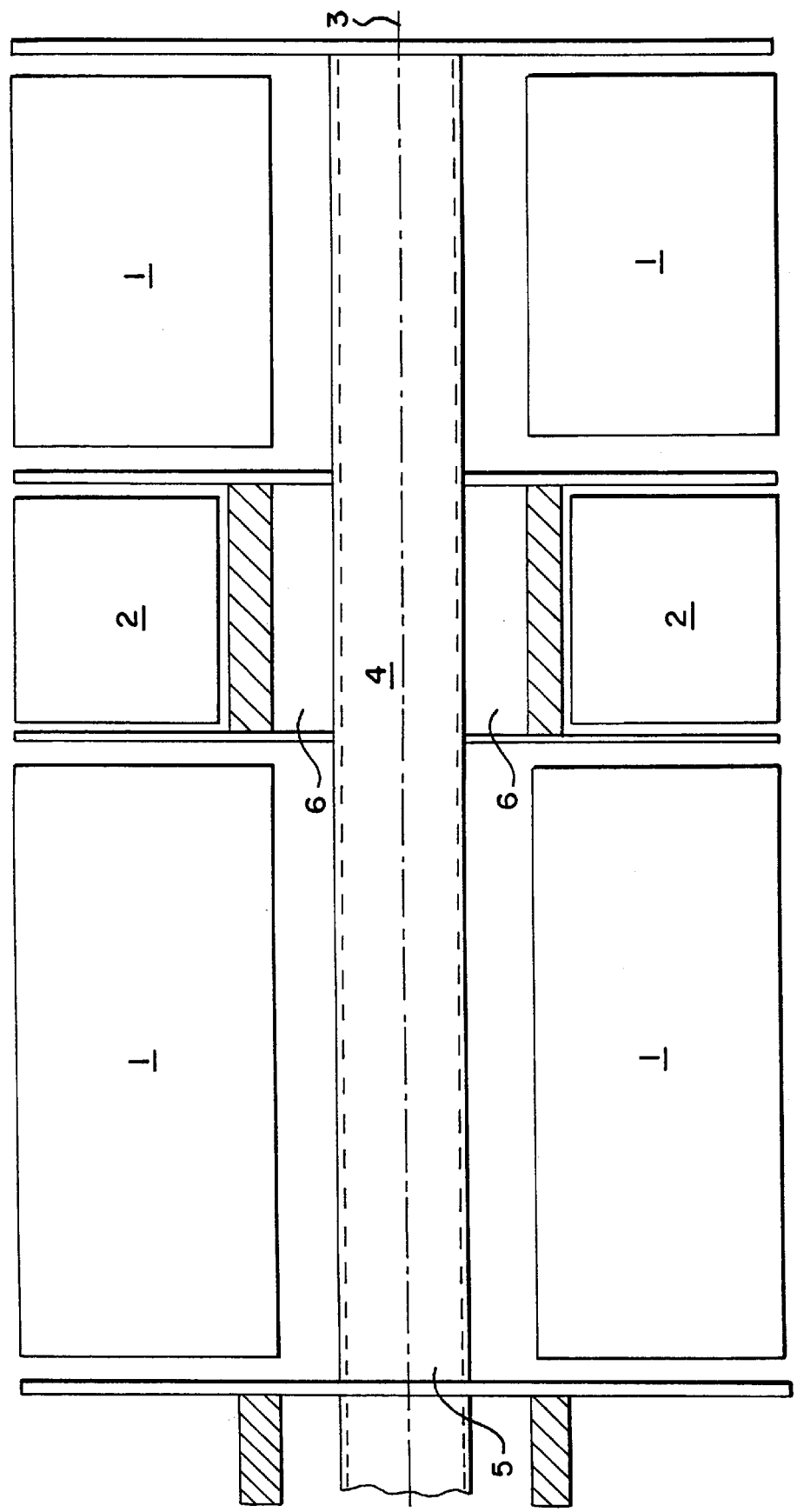
FIG. 2 shows a top view of a lorry provided with a body according to the invention.

FIG. 2 shows a top view of the vehicle of FIG. 1, the representation of the complete roof stays structure being omitted for reasons of clarity.

The loading boxes 1 and the cargo bays 2 are disposed symmetrically to the centre longitudinal axis 3 of the lorry. The representation of the driver's cab of the vehicle has been omitted.

Extending symmetrically and parallel to the centre longitudinal axis 3 of the vehicle there is a middle member 4, which, in the present illustrative embodiment, comprises a standard square tube and to which there are fastened transverse struts (not represented), as well as the loading boxes 1 and cargo bays 2.

Referring to FIG. 3, a section along the line III—III of FIG. 1 is represented, the representation of the driver's cab and of the cargo bays 2 of the vehicle having been omitted.

Each of the lowerable loading boxes 1 is guided in two guide rails 8, the loading boxes 1 being lifted and lowered respectively by means of two lifting devices realized as hydraulic cylinders 9, which are fitted on the middle member 4. The guide rails 8 run vertically, i.e. broadly perpendicular to the roadway, and can also be fastened to upper and lower transverse members (not represented). In the present illustrative embodiment, the guide rails 8 are however fastened to the middle member 4.

The hydraulic cylinders 9 and the loading boxes 1 are joined by a take-up device 20 (see FIG. 4), which is fixedly connected to the hydraulic cylinders 9 and in which the loading boxes 1 can easily be suspended, thereby enabling simple and problem-free replacement of the loading boxes 1. Alternatively, the loading boxes 1 can also however be fixedly connected to the take-up device 20.

The loading boxes 1 can also, of course, be raised and lowered by means of a pneumatic cylinder or by use of an electric motor driving, for example, a worm gearing or lifting spindle. Since a hydraulic and/or pneumatic system is however already present in many lorries, the loading boxes 1 are also preferably driven hydraulically or pneumatically.

In order to prevent the loading boxes 1 from being lowered uncontrollably, especially whilst the vehicle is running, securing devices are provided, which, in the present illustrative embodiment, are realized as pneumatic cylinders 10 which actuate a suitable locking device. The securing devices 10 are fastened to transverse members and are disposed in vertically running arrangement. If, as a result of a fault in the hydraulics circuit, for example as a result of a leak, an attempt should ever inadvertently be made to lower a loading box 1, then this catches on the lock of the securing device 10 and there is no danger of the loading box 1 hitting the roadway uncontrollably.

FIG. 4 shows a section along the line IV—IV of FIG. 1. The arrangement of unmoved transverse and vertical members 11, 12, 13, 13' and of guide rails 8, which are fastened to the middle member 4, is clearly discernible, as is the arrangement of the hydraulic cylinders 9 on the middle member 4 and the arrangement of the securing device 10. In the region of the transverse members 13 and 13' runs the universal joint shaft 14 of the vehicle. At this point, it should once again clearly be pointed out that the front axle is connected to the rear axle of the lorry only by the middle member 4, which therefore has also to absorb the greatest part of the incidental forces, and by the universal joint shaft 14, which however merely transmits the drive torque from the motor to the rear axle of the lorry.

The hydraulic cylinders 9 disposed on the middle member 4 are coupled to the saddle-shaped or bridge-shaped take-up device 20, to which the loading boxes 1 are attached, in turn, by means of transverse members 11.

Around the loading boxes 1 and the cargo bays 2 there is disposed a fixed frame which cannot be lowered, i.e. fixed roof stays 15 are provided, below which are located the lowerable loading boxes 1. If the loading boxes 1 are now lowered down to the roadway or, as mentioned at the beginning, raised to the height of a head ramp, then the roof stays 15 and the vertical and transverse members to which the roof stays 15 are connected remain in a fixed position.

This means that, during normal running, if the loading boxes 1 are raised to a height of about 400 mm above the roadway, a free space is left between the loading boxes 1 and cargo bays 2 and the roof stays 15.

Above the loading boxes 1 and the cargo bays 2 are disposed the fixed roof stays 15 represented in FIG. 5, which can be covered with metal sheeting or a canvas, so that the loading boxes 1 and the cargo bays 2 and, in particular, the apparatus for lifting and lowering the loading boxes 1 are broadly protected from weather influences. In addition, forces can also be absorbed by the roof stays 15, so that the vehicle body acquires sufficient stability, i.e. the incidental forces are at least partially transferred to the roof stays 15 and absorbed by them, since they constitute, together with the vertical and transverse members, a robust, fixed skeleton and a frame.

The vertical members, which join together the upper and lower transverse members of the vehicle body, can also be used as guide rails 8, or the guide rails 8 can advantageously be integrated into these vertical members, so that the complexity of assembly for the described apparatus is reduced.

We claim:

1. Bodied vehicle for transporting containers, boxes or other cargo in which a plurality of loading boxes for the reception of the containers, boxes or the other cargo are provided and at least part of the loading boxes can be lowered from a first position in said vehicle to a lowered position outside said vehicle, the loading boxes being fastened to both sides of a middle member running in a longitudinal direction of the vehicle and being mounted on a take-up device extending perpendicular to said middle member, a means for lifting and lowering the take-up device, said lifting and lowering means mounted to said middle member, vertical guide rails mounted to vertical side portions of said middle member for guiding said loading boxes in the movement of lifting and lowering and a fixed roof being provided above the loading boxes, wherein the roof has roof stays for absorbing at least part of the forces acting upon the vehicle and in that the loading boxes can be raised to a raised position above said first position, a free space being left between the loading boxes and the roof during normal running of the vehicle.

2. A vehicle according to claim 1, wherein the members of the roof stays are disposed diagonally across the loading boxes over the entire usable length of the vehicle body.

3. A vehicle according to claim 1, wherein the roof stays are attached to a plurality of vertical members running broadly perpendicular to the road surface.

4. A vehicle according to claim 3, wherein the vertical members are attached to transverse members running transversely to the vehicle longitudinal axis.

5. A vehicle according to claim 1, wherein a transverse members comprise upper and lower transverse members.

6. A vehicle according to claim 1, wherein the lifting device is driven hydraulically or pneumatically.

7. A vehicle according to claim 1 wherein each loading box is secured by at least one securing device.

8. A vehicle according to claim 7 wherein the securing device is realized as a pneumatic cylinder.

* * * * *